United States Patent
Graziosi

(10) Patent No.: US 10,389,994 B2
(45) Date of Patent: Aug. 20, 2019

(54) DECODER-CENTRIC UV CODEC FOR FREE-VIEWPOINT VIDEO STREAMING

(71) Applicant: SONY CORPORATION, Tokyo (JP)

(72) Inventor: Danillo Graziosi, San Jose, CA (US)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 15/816,094

(22) Filed: Nov. 17, 2017

(65) Prior Publication Data

US 2018/0152688 A1    May 31, 2018

Related U.S. Application Data

(60) Provisional application No. 62/426,900, filed on Nov. 28, 2016.

(51) Int. Cl.

| | |
|---|---|
| *H04N 13/117* | (2018.01) |
| *H04N 19/20* | (2014.01) |
| *H04N 19/597* | (2014.01) |
| *H04N 19/85* | (2014.01) |
| *H04N 13/282* | (2018.01) |
| *G06T 15/04* | (2011.01) |
| *H04N 13/161* | (2018.01) |
| *H04N 13/243* | (2018.01) |
| *H04N 13/178* | (2018.01) |

(52) U.S. Cl.
CPC .......... *H04N 13/117* (2018.05); *G06T 15/04* (2013.01); *H04N 13/161* (2018.05); *H04N 13/178* (2018.05); *H04N 13/243* (2018.05); *H04N 13/282* (2018.05); *H04N 19/20* (2014.11); *H04N 19/597* (2014.11); *H04N 19/85* (2014.11)

(58) Field of Classification Search
CPC ............................ H04N 19/597; H04N 19/50
See application file for complete search history.

(56) References Cited

U.S. PATENT DOCUMENTS

| | | | | |
|---|---|---|---|---|
| 9,807,373 | B1* | 10/2017 | Bruce | G01B 11/24 |
| 2009/0219282 | A1 | 9/2009 | Kim et al. | |
| 2015/0356769 | A1* | 12/2015 | Imber | G06T 15/80 |
| | | | | 345/426 |
| 2016/0360180 | A1* | 12/2016 | Cole | G06T 15/04 |
| 2017/0094262 | A1* | 3/2017 | Peterson | H04N 21/854 |
| 2017/0365069 | A1* | 12/2017 | Dupont | G06T 9/001 |

FOREIGN PATENT DOCUMENTS

EP            1026899 A1      8/2000

OTHER PUBLICATIONS

Laura Laura Toni Toni et al. "Optimal Representations for Adaptive Streaming in Interactive Multiview Video Systems", IEEE Transactions on Multimedia, Sep. 5, 2014 (Sep. 5, 2014), pp. 1-2787, XP055442224, DOI: 10.1109/TMM.20172713644 Retrieved from the Internet: URL:http://epubs.surrey.acluk/805874/1/Vol ino-BMVC-2014.pdf [retrieved on Jan. 18, 2018] the whole document.
International Search Report from International Application No. PCT/US2017/062461.
Gernot Ziegler et al., "Multi-Video Compression in Texture Space" MPI Informatik, Saarbrucken, Germany.

\* cited by examiner

*Primary Examiner* — Neil R Mikeska
(74) *Attorney, Agent, or Firm* — Haverstock & Owens LLP

(57) ABSTRACT

A decoder-centric codec for free-viewpoint video streaming enables a more efficient and more accurate process of capturing, preprocessing, encoding, decoding and rendering of multi-layer free-viewpoint video.

21 Claims, 9 Drawing Sheets

DECODER-CENTRIC UV CODEC FOR FREE-VIEWPOINT VIDEO STREAMING

CROSS-REFERENCE TO RELATED APPLICATION(S)

This application claims priority under 35 U.S.C. § 119(e) of the U.S. Provisional Patent Application Ser. No. 62/426,900, filed Nov. 28, 2016 and titled, "DECODER-CENTRIC UV CODEC FOR FREE-VIEWPOINT VIDEO STREAMING," which is hereby incorporated by reference in its entirety for all purposes.

FIELD OF THE INVENTION

The present invention relates to three dimensional graphics. More specifically, the present invention relates to sparse view multi-view three dimensional graphics.

BACKGROUND OF THE INVENTION

Free Viewpoint Video (FVV) is video which allows a user to change the viewpoint of the video at any time. For example, a user watching a sports video could change from watching the sports video from a perspective behind home plate to a perspective from the outfield. This enables users/viewers to view the content from a unique perspective.

Transmitting FVV has its challenges particularly when attempting to stream view-dependent FVV, such as a bottleneck being generated when transmitting camera metadata from the encoder-side to the decoder-side.

SUMMARY OF THE INVENTION

A decoder-centric codec for free-viewpoint video streaming enables a more efficient and more accurate process of capturing, preprocessing, encoding, decoding and rendering of multi-layer free-viewpoint video.

In one aspect, a method comprises preprocessing free viewpoint video content, encoding, using an encoder, the free viewpoint video content into encoded free viewpoint video content using a decoded geometry, decoding, using a decoder, the encoded free viewpoint video content into decoded free viewpoint video content and rendering the decoded free viewpoint video content on a device. Preprocessing the free viewpoint video content includes mesh generation, mesh tracking, UV atlas generation and texture mapping. The UV atlas generation and the texture mapping utilize a decoded shape from the decoder. The UV Atlas generation generates multi-layer texture with additional metadata to preserve the view-dependent characteristics of the free-viewpoint video content. The usage of view-independent information (e.g., single layer UV maps) versus view-dependent information (e.g., multi-layer UV map with additional metadata) may be signaled to the decoder. As an example of metadata, the encoder may send the camera configuration (e.g., extrinsic and intrinsic parameters of the multiple cameras capturing the scene), and for each texture layer can send the IDs of the cameras that contributed to that specific texture information in a particular UV layer, so that the decoder may choose the best camera according to the rendered viewing position. Encoding the free viewpoint video content with a decoder-centric architecture includes signaling the usage of view-dependent information, encoding vertices coordinates using a geometry encoder and encoding textures using UV texture encoder. Decoding the free viewpoint video content includes decoding using a geometry decoder and a UV texture decoder. Rendering the decoded free viewpoint video content utilizes decoded shape information, decoded texture information and camera identification information. The method further comprises generating the camera identification information at the decoder to be utilized to decode the encoded free viewpoint video content into the decoded free viewpoint video content. The method further comprises acquiring the free viewpoint video content using at most 10 video cameras. The method further comprises acquiring the free viewpoint video content using video cameras with at least 30 degrees of separation on every axis from other cameras.

In another aspect, an apparatus comprises a non-transitory memory for storing an application, the application for: preprocessing free viewpoint video content, encoding, using an encoder, the free viewpoint video content into encoded free viewpoint video content using a decoded geometry and a processor coupled to the memory, the processor configured for processing the application. Preprocessing the free viewpoint video content includes mesh generation, mesh tracking, UV atlas generation and texture mapping. The UV atlas generation and the texture mapping utilize a decoded shape from the decoder. Encoding the free viewpoint video content includes encoding vertices coordinates using a geometry encoder and encoding textures using UV texture encoder.

In another aspect, an apparatus comprises a non-transitory memory for storing an application, the application for: decoding, using a decoder, encoded free viewpoint video content into decoded free viewpoint video content by generating the camera identification information at the decoder to be utilized to decode the encoded free viewpoint video content into the decoded free viewpoint video content and rendering the decoded free viewpoint video content and a processor coupled to the memory, the processor configured for processing the application. Decoding the free viewpoint video content includes decoding using a geometry decoder and a UV texture decoder. Rendering the decoded free viewpoint video content utilizes decoded shape information, decoded texture information and camera identification information.

In another aspect, a system comprises a plurality of camera devices each configured for capturing free viewpoint video content, a first computing device configured for: preprocessing free viewpoint video content and encoding, using an encoder, the free viewpoint video content into encoded free viewpoint video content using a decoded geometry and a second computing device configured for: decoding, using a decoder, the encoded free viewpoint video content into decoded free viewpoint video content and rendering the decoded free viewpoint video content on the second computing device. Preprocessing the free viewpoint video content includes mesh generation, mesh tracking, UV atlas generation and texture mapping. The UV atlas generation and the texture mapping utilize a decoded shape from the decoder. Encoding the free viewpoint video content includes encoding vertices coordinates using a geometry encoder and encoding textures using UV texture encoder. Decoding the free viewpoint video content includes decoding using a geometry decoder and a UV texture decoder. Rendering the decoded free viewpoint video content utilizes decoded shape information, decoded texture information and camera identification information. The second computing device is further configured for generating the camera identification information at the decoder to be utilized to decode the encoded free viewpoint video content into the decoded free viewpoint video content.

DETAILED DESCRIPTION OF THE PREFERRED EMBODIMENT

Figure 1:
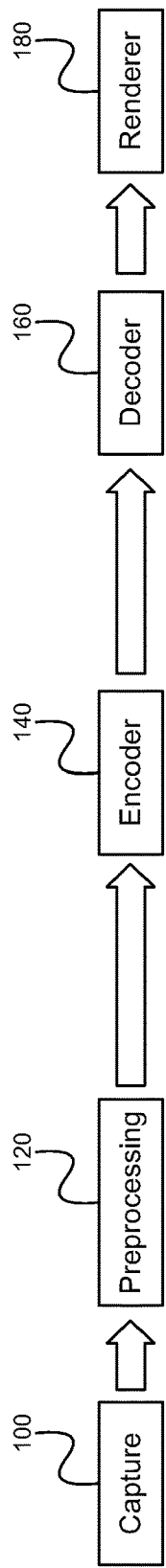
FIG. 1 illustrates a flowchart of operations performed in viewpoint video architectures according to some embodiments.

In free viewpoint architectures, the scene is captured from several different viewpoints. The captured content is usually processed at the capturing side, and transformed into a format that is encoded and further transmitted. The decoder will receive the encoded data format, decompress it and pass it to the renderer, which will use the received content to generate the required viewing position by the viewer. The format used for transmission must enable the renderer the flexibility to generate any required viewing position with photo-realistic quality, which imposes several constraints on data format and bandwidth.

In the acquisition stage, a dense view 3D video capture may utilize many cameras (e.g., 40-100+) to capture content from many different angles. More specifically, the spacing between the cameras may be very small (e.g., less than 5 degrees) between each camera. In dense view 3D video capture, data bandwidth is a major concern, and even video compression standards for Multiview capture such as MVC has performances conditioned by the amount of redundancy between the views and the amount of temporal change in the scene.

In order to alleviate the number of capturing views and still enable free view navigation, geometry can be used as a proxy to modify the acquired viewpoints and synthesize viewing positions that were not previously captured. One way to obtain the geometry of a scene is to utilize active depth cameras or perform depth estimation from captured views. The representation format resulting from this processing stage can be the depth of each captured RGB pixel, also known as a depth map. Transmission of sparse RGB camera views and corresponding depth maps can be done also using available standards, such as 3D-HEVC. However, usually the cameras are constrained to be linearly arranged and close to each other, which limits the navigation space. Moreover, occlusion is much more of a concern when using sparse view 3D video capture.

In computer graphics, full free viewpoint navigation is done by utilizing 3D meshes as the geometry proxies. 3D meshes can also be compressed using currently available standards, such as MPEG AFX coding tools for mesh compression. For free viewpoint navigation, captured views along with the mesh geometry can be used for transmission, but the performance is still constrained by the number of capturing views. The denser the number of views, the more realistic the rendering can be, but also the more bandwidth is necessary for texture transmission.

One way to use meshes as geometry proxies and reduce the bandwidth for texture transmission is to send only the texture associated with the surface of the 3D mesh. In some implementations, the texture of 3D mesh surfaces is mapped into a 2D texture atlas, also known as UV map. For transmission, the meshes along with their respective UV maps are the format of choice, which reduces significantly the transmission bandwidth. However, final rendering quality is constrained to a view independent quality, that is, regardless of the viewing position, the mesh surface will present the same RGB value, which is not the case with photo-realistic objects that might change their texture values according to the viewing position.

One way to preserve the photo-realism of surface texture atlas is to use a layered texture map. The view-dependent texture characteristic is provided by the relative position between the capturing camera and the mesh. In order to preserve this property, layers of texture record the texture from different cameras. The top layer stores for each mesh face the camera that has the highest rank, provided by the angle between the normal face and the camera viewing axis. In the subsequent layers, cameras from different viewing angles are stored. At the decoder side, depending on the chosen viewing position, a texture can be selected from the layer that contains the camera position closer to the desired viewing position, therefore providing a view closer to the realistic capture object.

The multi-layer UV texture approach requires more bandwidth for the texture transmission. Moreover, the ranking of the texture into layers may need to be transmitted as well. If the ranking relies on the geometry, artifacts in geometry compression can compromise the ranking results, which imposes the transmission of the ranking data to avoid texture artifacts originated by the geometry artifacts. The transmission of this metadata can severely impact the bandwidth, and can become the bottleneck for an efficient data transmission.

Described herein is an encoder architecture that is bandwidth efficient and avoids the transmission of metadata information. The encoder architecture still utilizes the multi-layer approach, but avoids the burdensome transmission of metadata by using the decoded geometry information for the texture mapping and ranking operation. With this new architecture, efficient transmission of multi-layer texture is possible for free viewpoint video.

Dense view 3D video capture utilizes many cameras (e.g., 40-100+) to capture content from many different angles. More specifically, the spacing between the cameras may be very small (e.g., less than 5 degrees) between each camera. In dense view 3D video capture, processing is relatively simple compared with sparse view 3D video capture, since in sparse view there are issues that arise that do not appear during dense view 3D video capture. For example, occlusion is much more of a concern when using sparse view 3D video capture.

Sparse view 3D video capture uses far fewer cameras to capture content from many different angles. For example, sparse view 3D video capture may use 10 or fewer cameras for the same space that dense view 3D video capture uses 100 cameras. Put another way, the spacing (on at least one or every axis) between the cameras may be 45 degrees or even 90 degrees. Since the cameras in sparse view 3D video capture are so far apart, it is difficult to perform shape reconstruction since stereo matching is not an option. Moreover, the amount of redundancy is reduced between views, which impacts the performance of compression algorithms. In this case, a data format that utilizes the mesh and the texture in the surface of the mesh is preferable for higher efficiency.

In order to achieve temporally consistent and photorealistic texture synthesis for FVV in a sparse-view 360 degree capturing system, a multi-layer texture data representation is utilized. The multi-layer texture data representation contains the texture contributions of several cameras combined in 2D textures, ordered by a criteria that ranks the cameras. One possible embodiment for the camera criteria is the angle between the camera and the 3D model surface data being captured, but other criteria may be applicable. To render view-dependent views using the multi-layer data, the identification (ID) of the camera that originated the texture is transmitted as well.

A decoder generates the camera ID information, given the received compressed mesh. The decoder-centric approach generates the camera ID information based on the decoded mesh, at the decoder side. In order to avoid mismatches between the encoder and decoder, the encoder performs texture mapping using the decompressed mesh, and not the original uncompressed mesh. By avoiding the transmission of metadata information such as camera ID information and utilizing the decompressed mesh for texture mapping, the transmission of UV coordinates (UV are axis of a texture atlas, a 2D image depicting the texture of the 3D model's surface) is avoided. This significantly reduces the bitrate necessary for the transmission of view-dependent data.

UV mapping is a 3D modeling process of projecting a 2D image onto the surface of a 3D model for texture mapping. Since X, Y and Z are used to denote axes of a 3D object in model space, U and V are axes of the 2D texture. In FVV, there are able to be multiple viewpoints (e.g., from different angles) of an object, which means there is extra data/metadata that is used when encoding and decoding the FVV content. However, by implementing a decoder-centric codec, the amount of extra data/metadata transmitted/streamed from the encoder to the decoder is significantly reduced.

FIG. 1 illustrates a flowchart of operations performed in viewpoint video architectures according to some embodiments. In the step 100, content is captured. In the step 120, the captured content is preprocessed. In the step 140, the processed content is encoded. In the step 160, the encoded content is decoded. In the step 180, the decoded content is rendered.

As described herein, the content is captured using sparse-view 3D video cameras. For example, multiple cameras capture 3D video from a plurality of different angles such as in front of, behind, to the left of and to the right of the object to capture.

The captured content is preprocessed. Preprocessing includes mesh generation, mesh tracking, UV atlas generation and texture mapping. Mesh generation includes any type of mesh generation such as using mesh templates, comparing and selecting a template based on the acquired content, and modifying the templates based on the shape of the acquired content using multiple views. Mesh tracking includes any type of mesh tracking such as temporally tracking the mesh in a non-rigid deformation or as described in U.S. patent application Ser. No., titled, "ROBUST MESH TRACKING AND FUSION BY USING PART-BASED KEY-FRAMES AND PRIORI-MODEL," which is hereby incorporated by reference in its entirety for all purposes. UV atlas generation generates a texture atlas or a tile map which contains a collection of sub-images, each of which is a texture map for part of a 3D model. The UV atlas generation is able to be performed in any manner including separating the acquired content based on groupings such as specific shapes, body parts and/or any other grouping. In some embodiments, the UV atlas generation uses a compressed shape (or the decompressed version of the compressed shape) and/or decoded shape from the decoder to generate the UV atlas. Texture mapping includes applying the texture component from the acquired content to the generated mesh (e.g., model). In some embodiments, the texture mapping is evaluated based on the compressed (or decompressed version of the compressed shape) and/or decoded shape.

From mesh tracking, the vertices coordinates and vertices connectivity are encoded by a geometry encoder. Textures such as multi-layer UV textures are encoded by a UV texture encoder using accompanying multi-layer camera IDs. The encoded content (e.g., encoded shape/geometry information) from the geometry encoder is sent (e.g., streamed) to a geometry decoder, and the encoded content (e.g., encoded texture information) from the UV texture encoder is sent (e.g., streamed) to a UV texture decoder. The geometry decoder decodes the encoded content (e.g., encoded shape/geometry information). The UV texture decoder decodes the encoded content (e.g., encoded texture information) by generating camera ID information to correspond with the appropriate texture information. The camera ID information is generated using the decoded shape information from the geometry decoder which is able to be used to determine the appropriate camera ID information. For example, the geometry of an object is associated with a specific camera ID, and based on the determined geometry of the object, the camera ID is able to be determined.

A rendering device is then able to render an FVV video using the decoded shape information from the geometry decoder, the decoded texture and the camera ID from the UV texture decoder In some embodiments, rendering includes displaying the FVV video and/or enabling a user to manipulate the FVV video.

Figure 2:
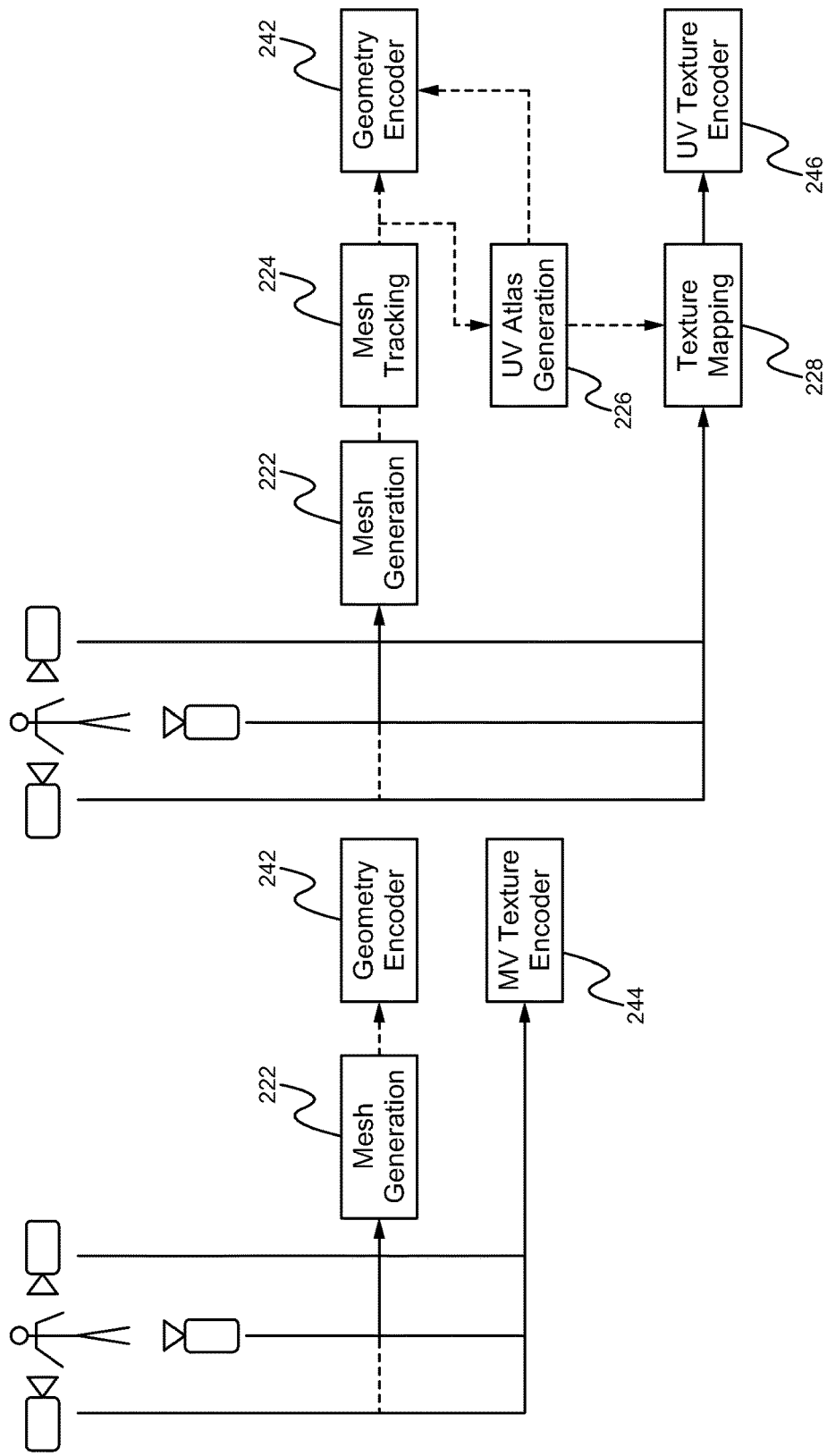
FIG. 2 illustrates examples of embodiments for compression and transmission of free viewpoint video data content according to some embodiments.

FIG. 2 illustrates examples of embodiments for compression and transmission of free viewpoint video data content according to some embodiments. As described herein, the content is captured using sparse-view 3D video cameras. For example, multiple cameras capture 3D video from a plurality of different angles such as in front of, behind, to the left of and to the right of the object to capture.

In some embodiments, the captured content goes through mesh generation 222. Mesh generation 222 includes any type of mesh generation such as using mesh templates, comparing and selecting a template based on the acquired content, and modifying the templates based on the shape of the acquired content using multiple views. Then, a geometry encoder 242 encodes the generated mesh data. The captured content also goes to an MV texture encoder 244. The MV texture encoder 244 encodes multi-view textures.

In some embodiments, the captured content goes through mesh generation 222, mesh tracking 224, UV atlas generation 226 and texture mapping 228. Mesh generation 222 includes any type of mesh generation such as using mesh templates, comparing and selecting a template based on the acquired content, and modifying the templates based on the shape of the acquired content using multiple views. Mesh tracking 224 includes any type of mesh tracking such as temporally tracking the mesh in a non-rigid deformation or as described in U.S. patent application Ser. No., titled, "ROBUST MESH TRACKING AND FUSION BY USING PART-BASED KEY-FRAMES AND PRIORI-MODEL," which is hereby incorporated by reference in its entirety for all purposes. UV atlas generation 226 generates a texture atlas or a tile map which contains a collection of sub-images, each of which is a texture map for part of a 3D model. The UV atlas generation 226 is able to be performed in any manner including separating the acquired content based on groupings such as specific shapes, body parts and/or any other grouping. In some embodiments, the UV atlas generation 226 uses a compressed shape (or the decompressed version of the compressed shape) and/or decoded shape from the decoder to generate the UV atlas. Texture mapping 228 includes applying the texture component from the acquired content to the generated mesh (e.g., model). In some embodiments, the texture mapping 228 is evaluated based on the compressed (or decompressed version of the compressed shape) and/or decoded shape.

Then, a geometry encoder 242 encodes the generated mesh data using the mesh tracking data and the UV Atlas. The captured content also goes to a UV texture encoder 246 after texture mapping 228 is applied. The UV texture encoder 246 encodes UV textures.

Figure 3:
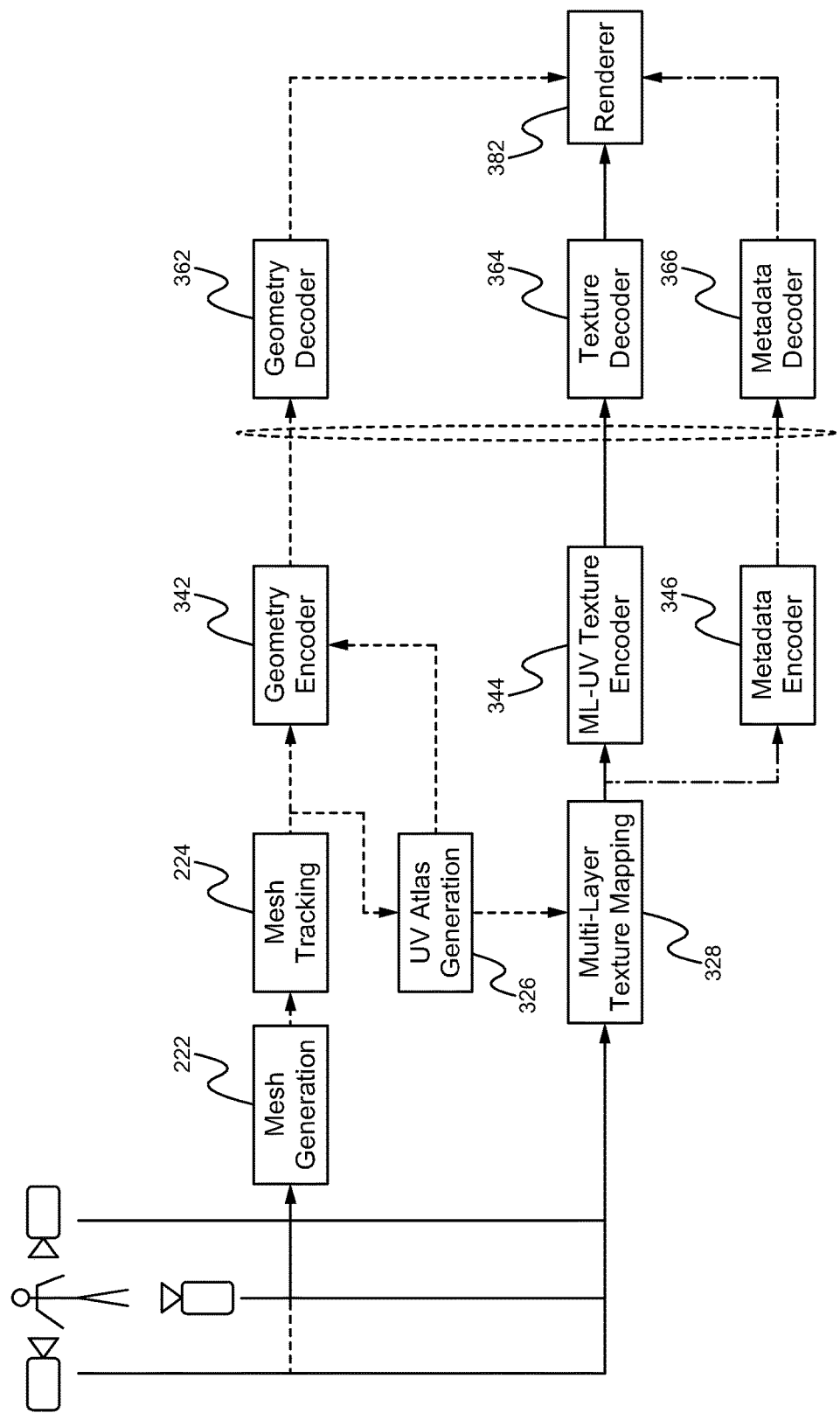
FIG. 3 illustrates examples of embodiments of an architecture for multi-layer free viewpoint video data content using the transmission of metadata information according to some embodiments.

FIG. 3 illustrates examples of embodiments of an architecture for multi-layer free viewpoint video data content using the transmission of metadata information according to some embodiments. As described herein, the content is captured using sparse-view 3D video cameras. For example, multiple cameras capture 3D video from a plurality of different angles such as in front of, behind, to the left of and to the right of the object to capture.

In some embodiments, the captured content goes through mesh generation 222, mesh tracking 224, UV atlas generation 326 and multi-layer texture mapping 228. Mesh generation 222, mesh tracking 224, UV atlas generation 326 and multi-layer texture mapping 228 have been described herein.

Then, a geometry encoder 242 encodes the generated mesh data using the mesh tracking data and the UV Atlas. The captured content also goes to an ML-UV (Multi-Layer-UV) texture encoder 344 and a metadata encoder 346 after multi-layer texture mapping 328 is applied. The ML-UV texture encoder 344 encodes multi-layer UV textures using UV atlas information.

The encoded content (e.g., encoded shape/geometry information) from the geometry encoder 342 is sent (e.g., streamed) to a geometry decoder 362, and the encoded content (e.g., encoded texture information) from the ML-UV texture encoder 344 is sent (e.g., streamed) to a texture decoder 364, and the encoded metadata 346 is sent (e.g., streamed) to a metadata decoder 366. The geometry decoder 362 decodes the encoded content (e.g., encoded shape/geometry information). The texture decoder 364 decodes the encoded content (e.g., encoded texture information). A metadata decoder 366 decodes the encoded metadata content.

A rendering device 382 is then able to render an FVV video using the decoded shape information from the geometry decoder 362, the decoded texture from the texture decoder 364 and the decoded metadata from the metadata decoder 366. In some embodiments, rendering includes displaying the FVV video and/or enabling a user to manipulate the FVV video.

Figure 4:
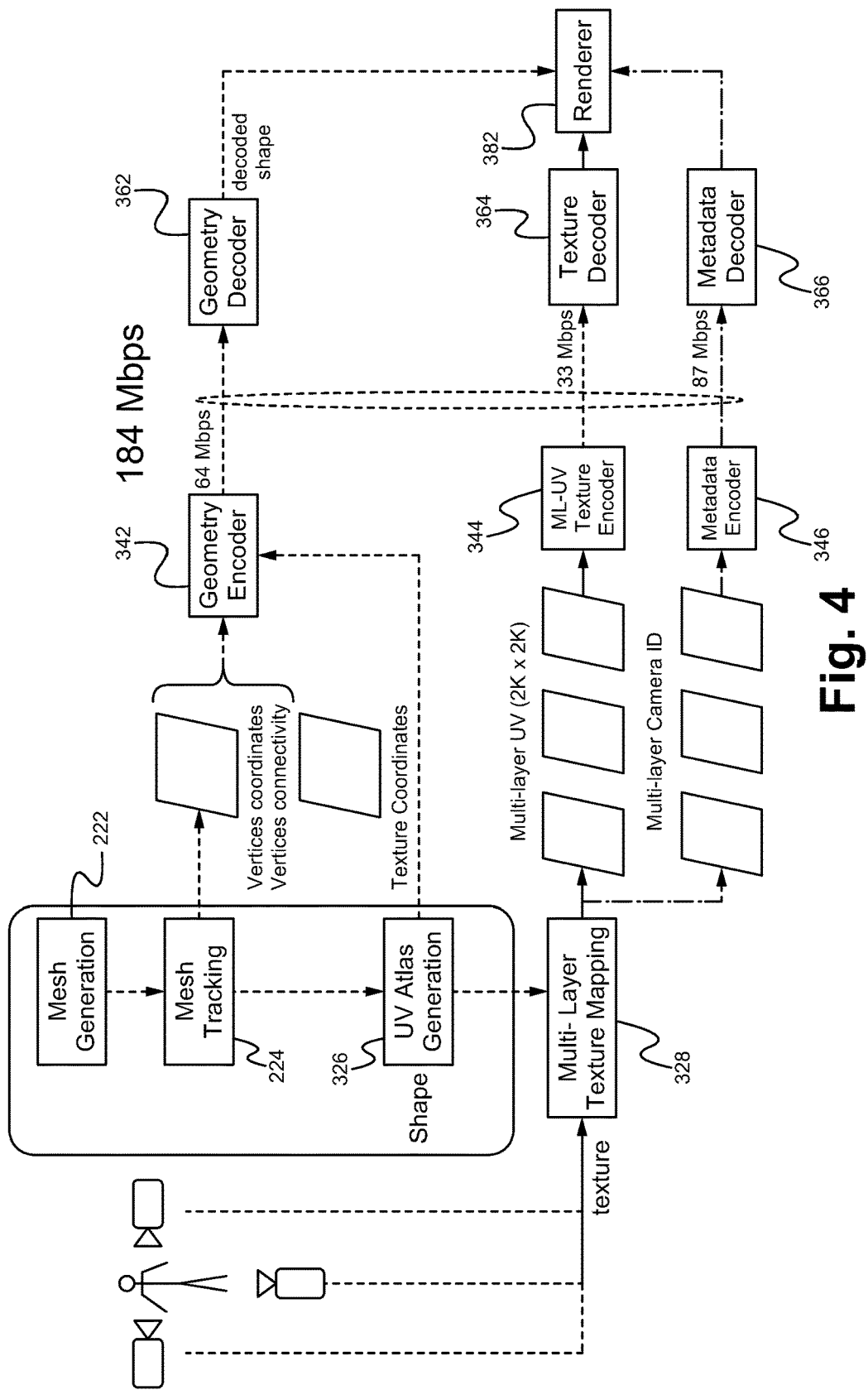
FIG. 4 illustrates another example of embodiments of an architecture for multi-layer free viewpoint video data content using the transmission of metadata information according to some embodiments.

FIG. 4 illustrates a particular example of embodiments of an architecture for multi-layer free viewpoint video data content using the transmission of metadata information according to some embodiments. As described herein, the content is captured using sparse-view 3D video cameras. For example, multiple cameras capture 3D video from a plurality of different angles such as in front of, behind, to the left of and to the right of the object to capture.

In some embodiments, the captured content goes through mesh generation 222, mesh tracking 224, UV atlas generation 326 and multi-layer texture mapping 228. Mesh generation 222, mesh tracking 224, UV atlas generation 326 and multi-layer texture mapping 228 have been described herein.

Then, a geometry encoder 242 encodes the generated mesh data using the mesh tracking data (for example, vertices coordinates and vertices connectivity) and the UV Atlas (for example, the texture coordinates). The captured content also goes to an ML-UV (Multi-Layer-UV) texture encoder 344 and a metadata encoder 346 after multi-layer texture mapping 328 is applied. The ML-UV texture encoder 344 encodes multi-layer UV textures using UV atlas information, for example, several layers of 2 k×2 k texture images.

The metadata encoder 346 encodes multi-layer camera ID, for example, images with the same size as the UV map (2 k×2 k), but where the camera ID is sent in place of the RGB value. The encoded content (e.g., encoded shape/geometry information) from the geometry encoder 342 is sent (e.g., streamed) to a geometry decoder 362, and the encoded content (e.g., encoded texture information) from the ML-UV texture encoder 344 is sent (e.g., streamed) to a texture decoder 364, and the encoded metadata 346 is sent (e.g., streamed) to a metadata decoder 366.

In some embodiments, the geometry encoder is just the MPEG mesh compression standard, AFX, which can encode a sequence of meshes with vertices coordinates, vertices connectivity and texture coordinates with a total bitrate of 64 Mbps. The multi-layer UV texture encoder 344 can be multiple video encoders, for example, MPEG standard for video compression, AVC. The compression of multi-layer UV maps with 2 k×2 k resolution, and 3 layers, from the multiple video encoders can achieve 33 Mbps. In this same embodiment, the camera ID information can be compressed with a lossless image encoder, such as a PNG encoder, and can reach 87 Mbps. A total of 184 Mbps is used to transmit the view-dependent information, and almost half of this bitrate is destined to the transmission of the camera ID information. The geometry decoder 362 decodes the encoded content (e.g., encoded shape/geometry information). The texture decoder 364 decodes the encoded content (e.g., encoded texture information). A metadata decoder 366 decodes the encoded metadata content. A rendering device 382 is then able to render an FVV video using the decoded shape information from the geometry decoder 362, the decoded texture from the texture decoder 364 and the decoded metadata from the metadata decoder 366. In some embodiments, rendering includes displaying the FVV video and/or enabling a user to manipulate the FVV video.

Figure 5:
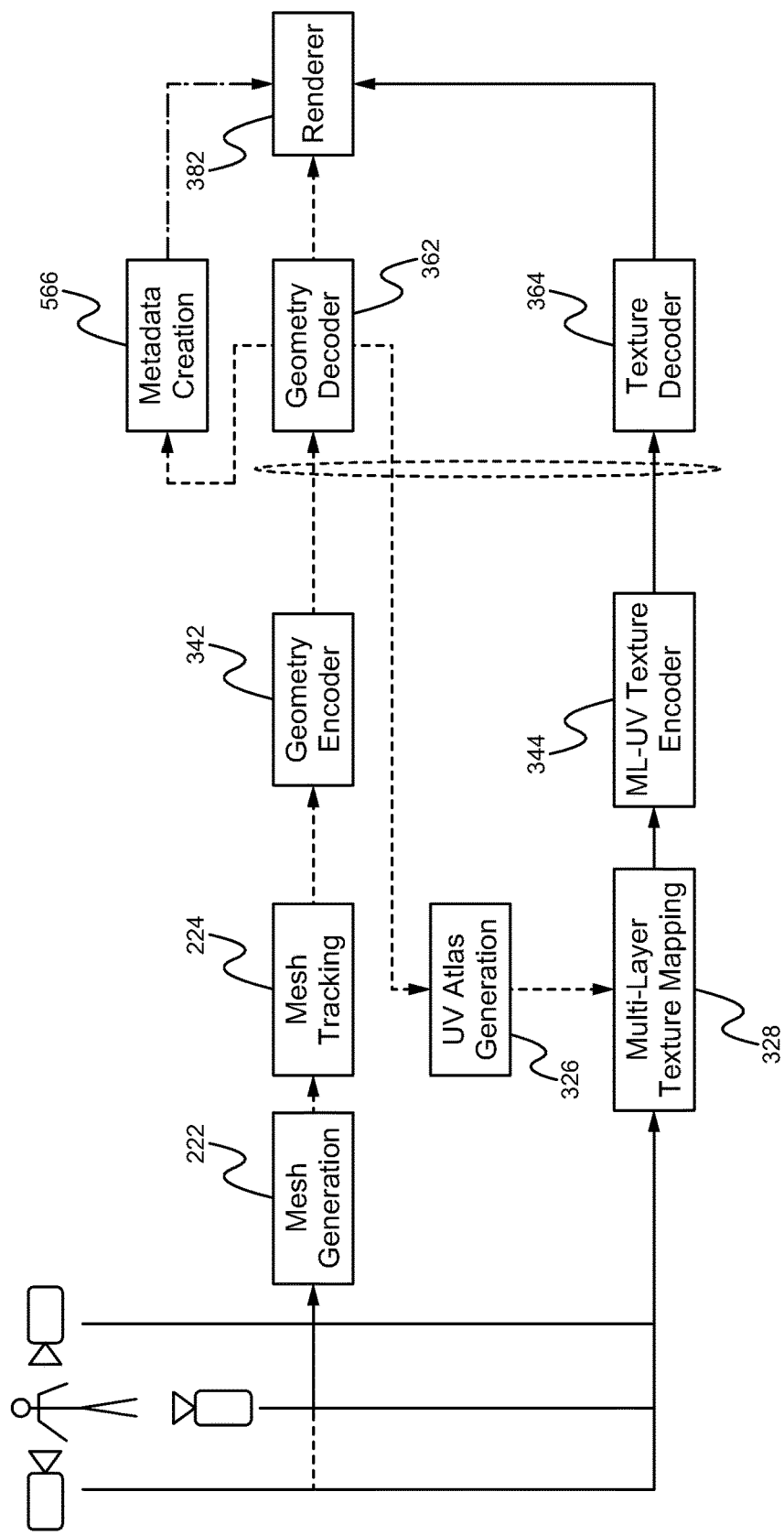
FIG. 5 illustrates a flowchart of a decoder-centric UV Codec (UVC) architecture according to some embodiments.

FIG. 5 illustrates a flowchart of a decoder-centric UV Codec (UVC) architecture according to some embodiments. As described herein, the content is captured using sparse-view 3D video cameras. For example, multiple cameras capture 3D video from a plurality of different angles such as in front of, behind, to the left of and to the right of the object to capture.

In some embodiments, the captured content goes through mesh generation 222, mesh tracking 224, UV atlas generation 326 and multi-layer texture mapping 228. Mesh generation 222, mesh tracking 224, UV atlas generation 326 and multi-layer texture mapping 228 have been described herein.

Then, a geometry encoder 242 encodes the generated mesh data using only the mesh tracking data. The captured content also goes to an ML-UV (Multi-Layer-UV) texture encoder 344 after multi-layer texture mapping 328 is applied. The ML-UV texture encoder 344 encodes multi-layer UV textures using UV atlas information.

The encoded content (e.g., encoded shape/geometry information) from the geometry encoder 342 is sent (e.g., streamed) to a geometry decoder 362, and the encoded content (e.g., encoded texture information) from the ML-UV texture encoder 344 is sent (e.g., streamed) to a texture decoder 364. The geometry decoder 362 decodes the encoded content (e.g., encoded shape/geometry information). The geometry decoder 362 is able to be replicated at the encoder side and also sends geometry information to the UV atlas generation 326 for multi-layer texture mapping. Metadata creation 466 is also implemented using geometry information from the geometry decoder 362. The texture decoder 364 decodes the encoded content (e.g., encoded texture information).

A rendering device 382 is then able to render an FVV video using the decoded shape information from the geometry decoder 362, the decoded texture from the texture decoder 364 and the metadata created 566 using decoded geometry from the geometry decoder 362. In some embodiments, rendering includes displaying the FVV video and/or enabling a user to manipulate the FVV video.

Figure 6:
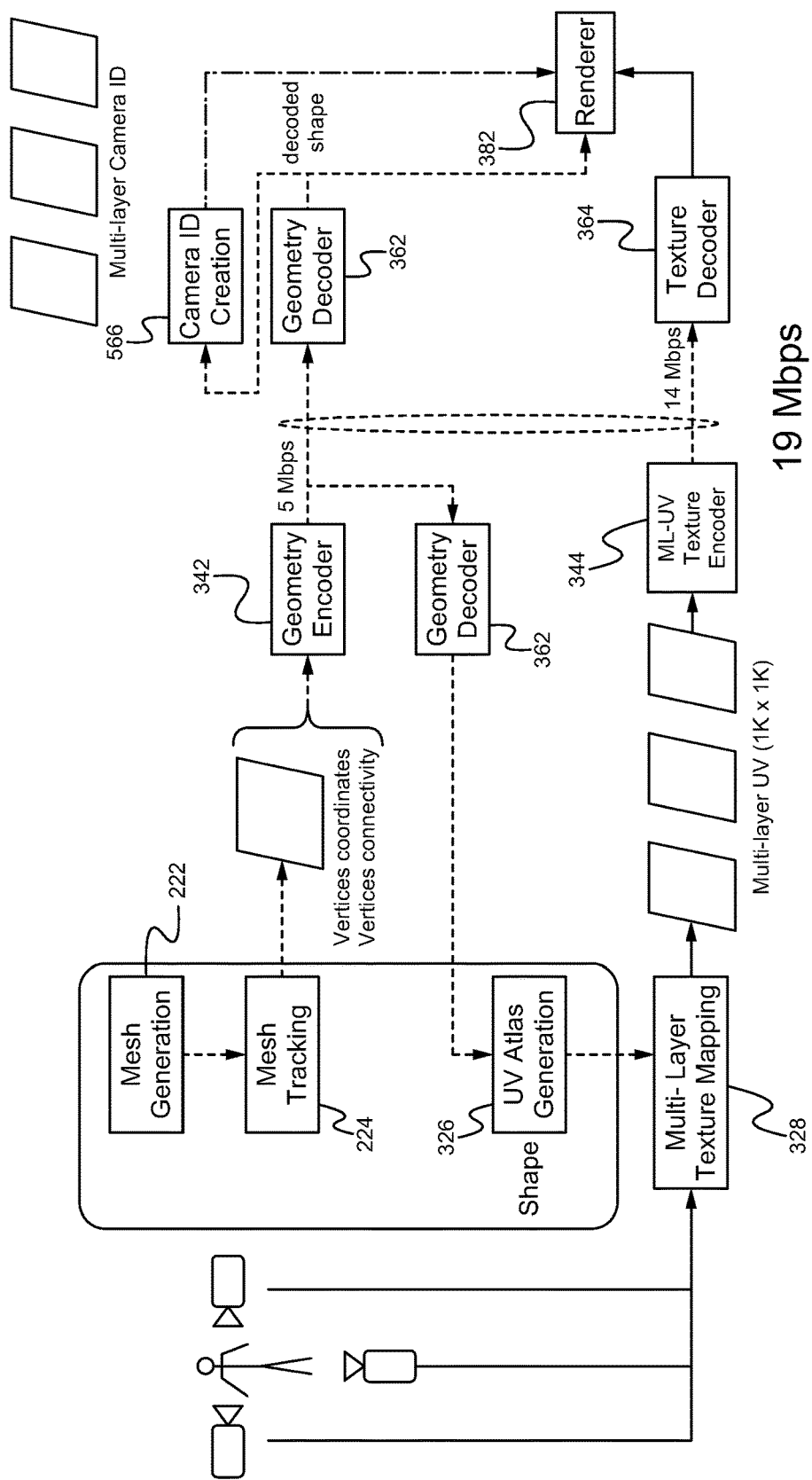
FIG. 6 illustrates a flowchart of a decoder-centric UV Codec (UVC) architecture according to some embodiments.

FIG. 6 illustrates a flowchart of a decoder-centric UV Codec (UVC) architecture according to some embodiments. As described herein, the content is captured using sparse-view 3D video cameras. For example, multiple cameras capture 3D video from a plurality of different angles such as in front of, behind, to the left of and to the right of the object to capture.

The captured content is preprocessed. Preprocessing includes mesh generation 222, mesh tracking 224, UV atlas generation 326 and texture mapping 328. Mesh generation 222 includes any type of mesh generation such as using mesh templates, comparing and selecting a template based on the acquired content, and modifying the templates based on the shape of the acquired content using multiple views. Mesh tracking 224 includes any type of mesh tracking such as temporally tracking the mesh in a non-rigid deformation or as described in U.S. patent application Ser. No., titled, "ROBUST MESH TRACKING AND FUSION BY USING PART-BASED KEY-FRAMES AND PRIORI-MODEL," which is hereby incorporated by reference in its entirety for all purposes. UV atlas generation 326 generates a texture atlas or a tile map which contains a collection of sub-images, each of which is a texture map for part of a 3D model. The UV atlas generation 326 is able to be performed in any manner including separating the acquired content based on groupings such as specific shapes, body parts and/or any other grouping. In some embodiments, the UV atlas generation 326 uses a compressed shape (or the decompressed version of the compressed shape) and/or decoded shape from the decoder to generate the UV atlas. Texture mapping 328 includes applying the texture component from the acquired content to the generated mesh (e.g., model). In some embodiments, the texture mapping 328 is evaluated based on the compressed (or decompressed version of the compressed shape) and/or decoded shape.

From mesh tracking 224, the vertices coordinates and vertices connectivity are encoded by a geometry encoder 342. In some embodiments, the geometry encoder may be the MPEG standard for dynamic mesh compression, also known as FAMC, which can produce a bitrate as little as 5 Mbps. Textures such as multi-layer UV (1K×1K) textures are encoded by a UV texture encoder 344. In some embodiments, the multi-layer texture encoder may be an instance of MPEG's standard for video compression, such as H.264/AVC, per layer. The MPEG encoders can generate total bitrates as low as 14 Mbps to encode three layers of 1 k×1 k texture, with a total of 19 Mbps to transmit view-dependent free viewpoint data. The encoded content (e.g., encoded shape/geometry information) from the geometry encoder 342 is sent (e.g., streamed) to a geometry decoder 362, and the encoded content (e.g., encoded texture information) from the UV texture encoder 344 is sent (e.g., streamed) to a UV texture decoder 364. The geometry decoder 362 decodes the encoded content (e.g., encoded shape/geometry information). Using the decoded geometry, the decoder can locally create 566 the camera ID information to correspond with the appropriate texture information. The camera ID information is generated using the decoded shape information from the geometry decoder 362 which is able to be used to determine the appropriate camera ID information. For example, the geometry of an object is associated with a specific camera ID, and based on the determined geometry of the object, the camera ID is able to be determined.

A rendering device 382 is then able to render an FVV video using the decoded shape information from the geometry decoder 362, the decoded texture and the camera ID created at the decoder side 566. In some embodiments, rendering includes displaying the FVV video and/or enabling a user to manipulate the FVV video. In some embodiments, the encoder may signal the usage of a multi-layer (e.g., view-dependent) approach versus a single-layer (e.g., view-independent) approach before sending the geometry and texture information.

In some embodiments, fewer or additional steps are implemented. In some embodiments, the order of the steps is modified. Furthermore, FIG. 5 is an exemplary embodiment with specific settings and measurements. It is understood that embodiments with other settings such as different resolutions settings are possible.

In some embodiments, the steps described herein occur on a same device, and in some embodiments, the steps occur on separate devices (e.g., capture devices, a preprocessing device, an encoder device, a decoder device and a rendering device). In another example, the capture devices include multiple 3D cameras, the preprocessing, encoding and decoding devices are servers or computing devices and the rendering device is a television. In yet another example, the capture devices include multiple 3D cameras, and the preprocessing devices and encoding devices are coupled to decoding devices and rendering devices via a network.

Figure 7:
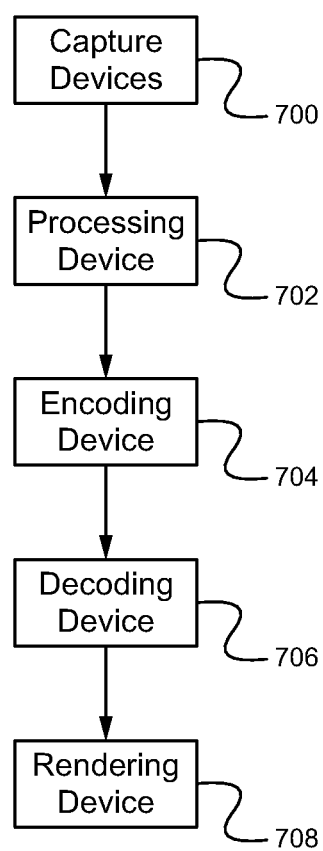
FIG. 7 illustrates a diagram of devices to implement the decoder-centric codec for FVV streaming according to some embodiments.

FIG. 7 illustrates a diagram of devices to implement the decoder-centric codec for FVV streaming according to some embodiments. Capture devices 700 capture FVV content from multiple different angles. For example, a sparse number (e.g., 10 or fewer) of cameras are positioned to simultaneously video record an object/scene. The captured content (e.g., multiple layers of content) is processed at a preprocessing device 702. The preprocessing device 702 performs mesh generation, mesh tracking, UV atlas generation and texture mapping. The preprocessing device 702 is able to be a server or any other computing device. After preprocessing, the appropriate content (e.g., vertices coordinates/connectivity, multi-layer UV and multi-layer camera IDs) goes to an encoding device 704 for encoding. The encoding device 704 is able to be part of the server (for pre-processing), a different server or a different computing device. The encoded content (e.g., encoded shape/geometry and encoded UV texture) is then sent (e.g., streamed) to a decoding device 706 for decoding the encoded content. The decoding device 706 is typically a separate device coupled to the encoding device 704 through a network (e.g., LAN or Internet). The decoded content is then received at a rendering device 708 for rendering (and display). In some embodiments, the decoding device 706 and the rendering device 708 are part of the same device (e.g., a television, computer with monitor), and in some embodiments the decoding device 706 and the rendering device 708 are in/on different devices.

Figure 8:
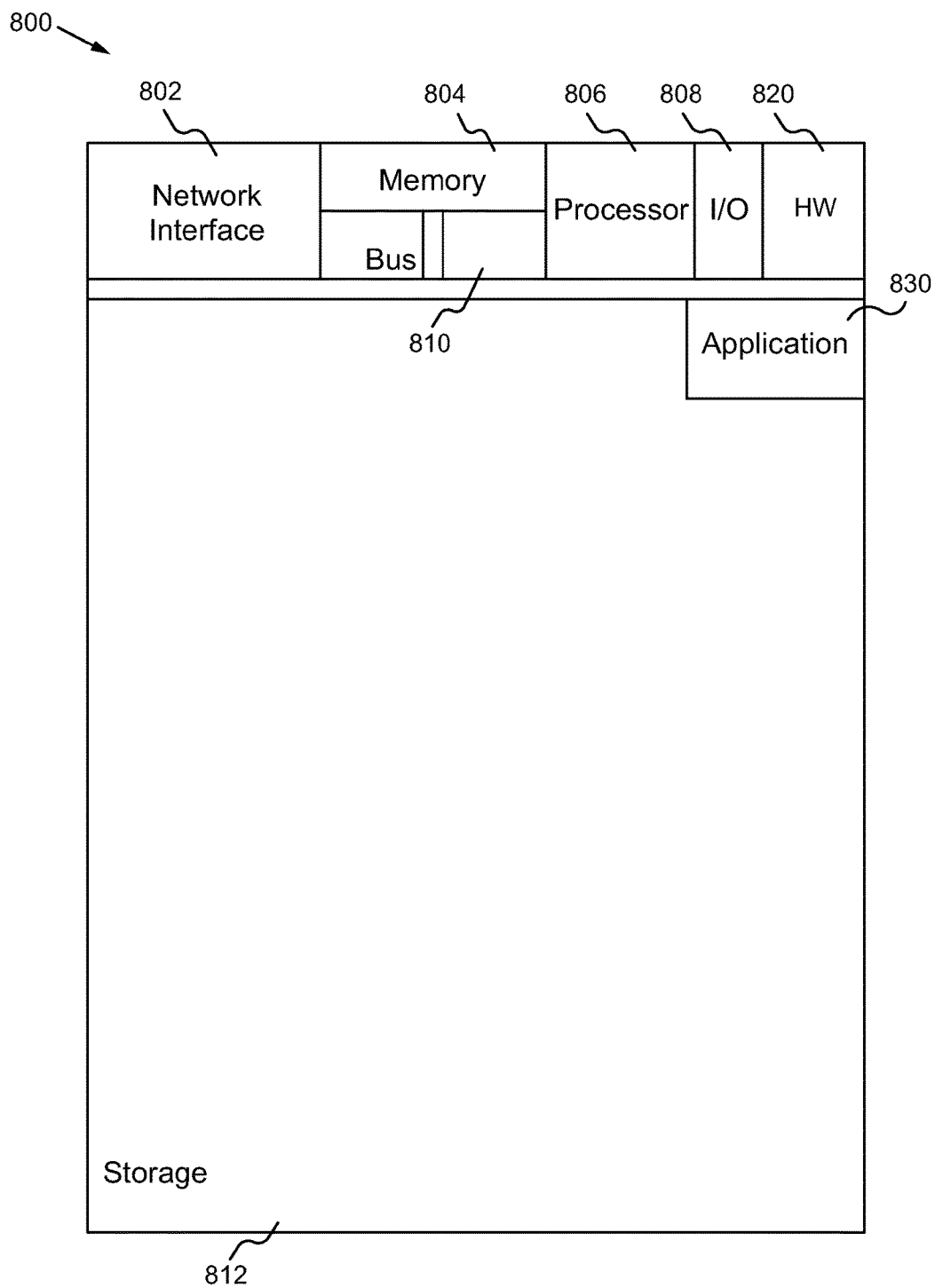
FIG. 8 illustrates a block diagram of an exemplary computing device configured to implement the decoder-centric UV codec according to some embodiments.

FIG. 8 illustrates a block diagram of an exemplary computing device configured to implement the decoder-centric UV codec according to some embodiments. The computing device 800 is able to be used to acquire, store, compute, process, communicate and/or display information such as images and videos (e.g., FVV). The computing device 800 is able to implement any of the decoder-centric UV codec aspects such as capturing, preprocessing, encoding, decoding and/or rendering. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Decoder-centric UV codec application(s) 830 used to implement the decoder-centric UV codec are likely to be stored in the storage device 812 and memory 804 and processed as applications are typically processed. More or fewer components shown in FIG. 8 are able to be included in the computing device 800. In some embodiments, decoder-centric UV codec hardware 820 is included. Although the computing device 800 in FIG. 8 includes applications 830 and hardware 820 for the decoder-centric UV codec, the decoder-centric UV codec is able to be implemented on a computing device in hardware, firmware, software or any combination thereof. For example, in some embodiments, the decoder-centric UV codec applications 830 are programmed in a memory and executed using a processor. In another example, in some embodiments, the decoder-centric UV codec hardware 820 is programmed hardware logic including gates specifically designed to implement the decoder-centric UV codec.

In some embodiments, the decoder-centric UV codec application(s) 830 include several applications and/or modules. In some embodiments, modules include one or more sub-modules as well. In some embodiments, fewer or additional modules are able to be included.

In some embodiments, the decoder-centric UV codec hardware 820 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

Figure 9:
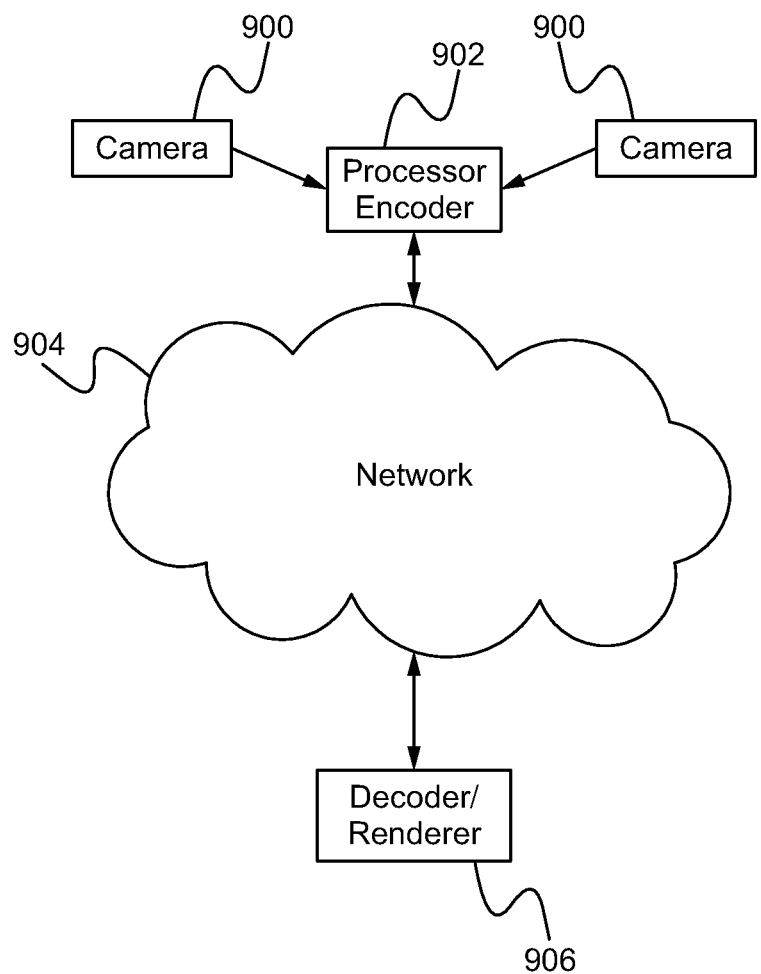
FIG. 9 illustrates a diagram of a network of devices according to some embodiments.

FIG. 9 illustrates a diagram of a network of devices according to some embodiments. A plurality of cameras 900 are utilized to acquire 3D/FVV video content. The video content is processed and encoded at one or more processor/encoder devices 902. The encoded content is transmitted/streamed through a network 904 (e.g., the Internet, a cellular network or any other network) to one or more decoder/renderer devices 906. In some embodiments, the content is transmitted to the one or more decoder/renderer devices 906 directly without a network. The one or more devices of the network of devices (e.g., processor/encoder device, decoder/renderer device) is configured to perform the decoder-centric UV codec implementation described herein. The one or more processor/encoder devices 902 and the one or more decoder/renderer devices 906 are able to be any device such as servers, a personal computers, smart phones, televisions, gaming systems or any of the devices described herein or any combination of devices described herein. In some embodiments, the camera(s) 900 implement additional aspects of the decoder-centric UV codec such as preprocessing and/or encoding.

To utilize the decoder-centric UV codec described herein, devices such as digital cameras/camcorders are used to acquire 3D/FVV content. The decoder-centric UV codec is able to be implemented with user assistance or automatically without user involvement to efficiently encode, transmit, decode and render the 3D/FVV content. Then, upon playback of the acquired content, a more accurate content is displayed (e.g., with fewer or no artifacts). In operation, the decoder-centric UV codec generates more accurate content than previous implementations. Further, the decoder-centric UV codec is more efficient by utilizing decoder geometry at the encoder and by inferring the camera ID from the geometry at the decoder. Much less metadata is sent from the encoder to the decoder by using the decoder-centric UV codec.

Some Embodiments of Decoder-Centric Uv Codec for Free-Viewpoint Video Streaming

1. A method comprising:
    preprocessing free viewpoint video content;
    encoding, using an encoder, the free viewpoint video content into encoded free viewpoint video content using a decoded geometry;
    decoding, using a decoder, the encoded free viewpoint video content into decoded free viewpoint video content; and
    rendering the decoded free viewpoint video content on a device.
2. The method of clause 1 wherein preprocessing the free viewpoint video content includes mesh generation, mesh tracking, UV atlas generation and texture mapping.

3. The method of clause 2 wherein the UV atlas generation and the texture mapping utilize a decoded shape from the decoder.
4. The method of clause 1 wherein encoding the free viewpoint video content includes encoding vertices coordinates using a geometry encoder and encoding textures using UV texture encoder.
5. The method of clause 1 wherein decoding the free viewpoint video content includes decoding using a geometry decoder and a UV texture decoder.
6. The method of clause 1 wherein rendering the decoded free viewpoint video content utilizes decoded shape information, decoded texture information and camera identification information.
7. The method of clause 1 further comprising generating the camera identification information at the decoder to be utilized to decode the encoded free viewpoint video content into the decoded free viewpoint video content.
8. The method of clause 1 further comprising acquiring the free viewpoint video content using at most 10 video cameras.
9. The method of clause 1 further comprising acquiring the free viewpoint video content using video cameras with at least 30 degrees of separation on every axis from other cameras.
10. The method of clause 1 further comprising signaling of usage of a multi-layer texture for view-dependent rendering.
11. The method of clause 1 further comprising associating a camera identification to a pixel in each texture layer of a multi-layer texture representation.
12. An apparatus comprising:
a non-transitory memory for storing an application, the application for:
preprocessing free viewpoint video content;
encoding, using an encoder, the free viewpoint video content into encoded free viewpoint video content using a decoded geometry; and
a processor coupled to the memory, the processor configured for processing the application.
13. The apparatus of clause 12 wherein preprocessing the free viewpoint video content includes mesh generation, mesh tracking, UV atlas generation and texture mapping.
14. The apparatus of clause 13 wherein the UV atlas generation and the texture mapping utilize a decoded shape from the decoder.
15. The apparatus of clause 12 wherein encoding the free viewpoint video content includes encoding vertices coordinates using a geometry encoder and encoding textures using UV texture encoder.
16. An apparatus comprising:
a non-transitory memory for storing an application, the application for:
decoding, using a decoder, encoded free viewpoint video content into decoded free viewpoint video content by generating the camera identification information at the decoder to be utilized to decode the encoded free viewpoint video content into the decoded free viewpoint video content; and
rendering the decoded free viewpoint video content; and
a processor coupled to the memory, the processor configured for processing the application.
17. The apparatus of clause 16 wherein decoding the free viewpoint video content includes decoding using a geometry decoder and a UV texture decoder.
18. The apparatus of clause 16 wherein rendering the decoded free viewpoint video content utilizes decoded shape information, decoded texture information and camera identification information.
19. A system comprising:
a plurality of camera devices each configured for capturing free viewpoint video content;
a first computing device configured for:
preprocessing free viewpoint video content; and
encoding, using an encoder, the free viewpoint video content into encoded free viewpoint video content using a decoded geometry; and
a second computing device configured for:
decoding, using a decoder, the encoded free viewpoint video content into decoded free viewpoint video content; and
rendering the decoded free viewpoint video content on the second computing device.
20. The system of clause 19 wherein preprocessing the free viewpoint video content includes mesh generation, mesh tracking, UV atlas generation and texture mapping.
21. The system of clause 19 wherein the UV atlas generation and the texture mapping utilize a decoded shape from the decoder.
22. The system of clause 19 wherein encoding the free viewpoint video content includes encoding vertices coordinates using a geometry encoder and encoding textures using UV texture encoder.
23. The system of clause 19 wherein decoding the free viewpoint video content includes decoding using a geometry decoder and a UV texture decoder.
24. The system of clause 19 wherein rendering the decoded free viewpoint video content utilizes decoded shape information, decoded texture information and camera identification information.
25. The system of clause 19 wherein the second computing device is further configured for generating the camera identification information at the decoder to be utilized to decode the encoded free viewpoint video content into the decoded free viewpoint video content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
preprocessing free viewpoint video content;
encoding, using an encoder, the free viewpoint video content into encoded free viewpoint video content using a decoded geometry;
generating camera identification information, using a decoder, to be utilized to decode the encoded free viewpoint video content into decoded free viewpoint video content;
decoding, using the decoder, the encoded free viewpoint video content into the decoded free viewpoint video content; and
rendering the decoded free viewpoint video content on a device, wherein rendering the decoded free viewpoint video content utilizes decoded shape information, decoded texture information and the camera identification information.

2. The method of claim 1 wherein preprocessing the free viewpoint video content includes mesh generation, mesh tracking, UV atlas generation and texture mapping.

3. The method of claim 2 wherein the UV atlas generation and the texture mapping utilize a decoded shape from the decoder.

4. The method of claim 1 wherein encoding the free viewpoint video content includes encoding vertices coordinates using a geometry encoder and encoding textures using UV texture encoder.

5. The method of claim 1 wherein decoding the free viewpoint video content includes decoding using a geometry decoder and a UV texture decoder.

6. The method of claim 1 further comprising acquiring the free viewpoint video content using at most 10 video cameras.

7. The method of claim 1 further comprising acquiring the free viewpoint video content using video cameras with at least 30 degrees of separation on every axis from other cameras.

8. The method of claim 1 further comprising signaling of usage of a multi-layer texture for view-dependent rendering.

9. The method of claim 1 further comprising associating a camera identification to a pixel in each texture layer of a multi-layer texture representation.

10. An apparatus comprising:
a non-transitory memory for storing an application, the application for:
preprocessing free viewpoint video content;
encoding, using an encoder, the free viewpoint video content into encoded free viewpoint video content using a decoded geometry; and
a processor coupled to the memory, the processor configured for processing the application.

11. The apparatus of claim 10 wherein preprocessing the free viewpoint video content includes mesh generation, mesh tracking, UV atlas generation and texture mapping.

12. The apparatus of claim 11 wherein the UV atlas generation and the texture mapping utilize a decoded shape from the decoder.

13. The apparatus of claim 10 wherein encoding the free viewpoint video content includes encoding vertices coordinates using a geometry encoder and encoding textures using UV texture encoder.

14. An apparatus comprising:
a non-transitory memory for storing an application, the application for:
generating camera identification information, using a decoder, to be utilized to decode encoded free viewpoint video content into decoded free viewpoint video content;
decoding, using the decoder, the encoded free viewpoint video content into the decoded free viewpoint video content by generating the camera identification information at the decoder to be utilized to decode the encoded free viewpoint video content into the decoded free viewpoint video content; and
rendering the decoded free viewpoint video content, wherein rendering the decoded free viewpoint video content utilizes decoded shape information, decoded texture information and the camera identification information; and
a processor coupled to the memory, the processor configured for processing the application.

15. The apparatus of claim 14 wherein decoding the free viewpoint video content includes decoding using a geometry decoder and a UV texture decoder.

16. A system comprising:
a plurality of camera devices each configured for capturing free viewpoint video content;
a first computing device configured for:
preprocessing free viewpoint video content; and
encoding, using an encoder, the free viewpoint video content into encoded free viewpoint video content using a decoded geometry; and
a second computing device configured for:
generating camera identification information, using a decoder, to be utilized to decode the encoded free viewpoint video content into decoded free viewpoint video content;
decoding, using the decoder, the encoded free viewpoint video content into the decoded free viewpoint video content; and
rendering the decoded free viewpoint video content on the second computing device, wherein rendering the decoded free viewpoint video content utilizes decoded shape information, decoded texture information and the camera identification information.

17. The system of claim 16 wherein preprocessing the free viewpoint video content includes mesh generation, mesh tracking, UV atlas generation and texture mapping.

18. The system of claim 16 wherein the UV atlas generation and the texture mapping utilize a decoded shape from the decoder.

19. The system of claim 16 wherein encoding the free viewpoint video content includes encoding vertices coordinates using a geometry encoder and encoding textures using UV texture encoder.

20. The system of claim 16 wherein decoding the free viewpoint video content includes decoding using a geometry decoder and a UV texture decoder.

21. The system of claim 16 wherein the second computing device is further configured for generating the camera identification information at the decoder to be utilized to decode the encoded free viewpoint video content into the decoded free viewpoint video content.

* * * * *